(12) United States Patent
Burtsev et al.

(10) Patent No.: US 11,749,238 B1
(45) Date of Patent: Sep. 5, 2023

(54) CONTEXT BASED TAB AUTOSCROLLING

(71) Applicant: MUSE CY LIMITED, Mesa Geitonia (CY)

(72) Inventors: Pavel Burtsev, Ghent (BE); Andrei Lakobchuk, Ghent (BE)

( * ) Notice: Subject to any disclaimer, the term of this patent is extended or adjusted under 35 U.S.C. 154(b) by 0 days.

(21) Appl. No.: 18/064,756

(22) Filed: Dec. 12, 2022

(51) Int. Cl.
*G10G 1/04* (2006.01)
*G06F 3/0483* (2013.01)
*G06F 3/0485* (2022.01)
*G10H 1/00* (2006.01)
*G06F 3/16* (2006.01)

(52) U.S. Cl.
CPC .............. *G10G 1/04* (2013.01); *G06F 3/0483* (2013.01); *G06F 3/0485* (2013.01); *G06F 3/165* (2013.01); *G10H 1/0008* (2013.01); *G10H 2220/011* (2013.01); *G10H 2220/015* (2013.01); *G10H 2220/091* (2013.01)

(58) Field of Classification Search
CPC ....... G10G 1/04; G06F 3/0483; G06F 3/0485; G06F 3/165; G10H 1/0008; G10H 2220/011; G10H 2220/015; G10H 2220/091
See application file for complete search history.

(56) References Cited

U.S. PATENT DOCUMENTS

| | | | | |
|---|---|---|---|---|
| 2017/0018262 | A1* | 1/2017 | Piñuela Irrisarri | G10G 1/00 |
| 2021/0225344 | A1* | 7/2021 | Humphrey | G06F 3/0481 |
| 2023/0067175 | A1* | 3/2023 | Hiipakka | G10H 1/0016 |

* cited by examiner

*Primary Examiner* — Jianchun Qin
(74) *Attorney, Agent, or Firm* — RC Trademark Company

(57) ABSTRACT

In general terms the present disclosure proposes computer-implemented method for context-based scrolling of tablature. The computer-implemented method comprises receiving, at computer, tablature from device at which tablature is stored or is generated, wherein computer comprises at least one processor, determining structure of tablature using at least one feature recognition algorithm, using at least one processor, determining one or more parameters of display environment, using at least one processor, building abstract syntax tree of tablature comprising an array of structural elements of tablature, using at least one processor, determining scrolling time period in which portion of the tablature that is displayed on given region of a viewport of display environment is to be replaced by a next portion of tablature, using at least one processor, and scrolling tablature according to at least abstract syntax tree of tablature and scrolling time period, in display environment, using the at least one processor.

15 Claims, 8 Drawing Sheets

CONTEXT BASED TAB AUTOSCROLLING

TECHNICAL FIELD

This disclosure relates to the field of displaying musical works in electronic format. In particular, though not exclusively, this disclosure relates to a computer-implemented method for context-based scrolling of a tablature, a system for context-based scrolling of a tablature, and a computer program product for context-based scrolling of a tablature.

BACKGROUND

With the advancement in technology, the music industry has been evolving day by day. In this regard, the process of creating and learning music is changing with the evolution of various musical instruments and devices. Traditionally, while preparing a song, a music composer used to prepare a musical notation such as a tablature by hand. Notably, various notation applications have also been used to make the process of creating musical notation much easier and faster than the traditional practice of writing by hand.

Conventionally, the musicians used to carry handwritten musical notations while playing the musical instrument. However, such handwritten musical notations include several pages that require to be turned when playing the musical instrument. Moreover, there exist various electronic devices for displaying the musical notation. However, it is difficult to scroll such musical notation during the musical performance. Furthermore, there exists some electronic equipment that is used for the automatic scrolling of corresponding electronic musical notations associated therewith. However, such electronic musical notations are inconvenient to view on a small-screen portable electronic device (such as a mobile terminal such as a mobile phone), and it is still necessary to manually scroll and page through to view the entire contents of the musical notation.

Typically, most pieces of the musical notations do not fit on one screen of the portable electronic devices. Thus, it is inconvenient for a musician to scroll the musical notation. Moreover, the sizes of such screens and the text or tablature that make up a piece of music are different. Furthermore, each piece of the musical notation has a unique tempo, that makes it impossible to set one speed at which the text would scroll. Additionally, there exist some notation applications to scroll the musical notation in an electronic format. Such notation applications imply a tab markup that allows the musician to understand which part of the tab is being played or sung, place the active line of the tab at one and the same position on the screen, and highlight a word or its part that should be sung at the moment. However, such notation applications are not user-friendly and fail to deliver the desired accuracy.

It is an object of the disclosure to address at least one of the above problems or another problem associated with the prior art.

SUMMARY OF THE DISCLOSURE

A first aspect of the disclosure provides a computer-implemented method for context-based scrolling of a tablature, the method comprising receiving, at a computer, the tablature from a device at which the tablature is stored or is generated, wherein the computer comprises at least one processor, determining a structure of the tablature using at least one feature recognition algorithm, using the at least one processor, wherein the structure of the tablature is indicative of structural elements of the tablature, determining one or more parameters of a display environment whereat the tablature is to be scrolled, using the at least one processor, building an abstract syntax tree of the tablature comprising an array of the structural elements of the tablature, using the at least one processor, based on the structure of the tablature and the one or more parameters, determining a scrolling time period in which a portion of the tablature that is displayed on a given region of a viewport of the display environment is to be replaced by a next portion of the tablature, using the at least one processor and scrolling the tablature according to at least the abstract syntax tree of the tablature and the scrolling time period, in the display environment, using the at least one processor.

Suitably, the method enables the context-based scrolling of the tablature in an easier and intuitive way. It will be appreciated that the method enables an efficient and accurate scrolling of the tablature. Moreover, the method ensures that the user has a required part of the tablature that is being played in front thereof. Advantageously, the method is robust, user-friendly, and time efficient.

Herein, the term "tablature" refers to a digital form of musical notation that indicates a position of a user's finger on a physical musical instrument to generate the musical note therefrom. Optionally, the user may be a musician, an instrumentalist, a music learner, and so forth. Optionally, the tablature may be used for displaying a musical composition. Optionally, the tablature may include multiple rows of staff lines composed of text strings and tablature lines. For example, the tablature of a guitar includes six staff lines corresponding to six strings of the guitar. The method comprises receiving, at a computer, the tablature from the device at which the tablature is stored. Optionally, the computer comprises at least one processor. Herein, the computer refers to a digital electronic machine that is programmed to perform sequences of arithmetic or logical operations (computation) automatically. Optionally, the computer may be implemented as a computing arrangement of a portable or a non-portable electronic device. Optionally, the portable electronic device may be a laptop, a mobile phone, a tablet, a palm top, and so forth. Optionally, the non-portable device may be a laptop, a desktop, and so forth. Suitably, the method employs at least one processor for receiving the tablature. The term "at least one processor" as used herein refers to an application, program, or device that responds to requests for information or services by another application, program, process or device (such as the external device) via a network interface. Optionally, the at least one processor also encompasses software that makes the act of serving information or providing services possible. It will be appreciated that optionally the processor includes, but is not limited to, a microprocessor, a microcontroller, a complex instruction set computing (CISC) microprocessor, a reduced instruction set computer (RISC) microprocessor, a very long instruction word (VLIW) microprocessor, or any other type of processing circuit.

Optionally, the device may be operable to store the tablature that is previously-created by the user or another user. Optionally, the step of receiving the tablature, at a computer, includes downloading the tablature from the device. Moreover, the tablature is received, at a computer, from the device at which the tablature is generated. Optionally, the tablature may be generated and scrolled at the same device. Optionally, the device may be an external device such as a cloud server, a computer, a mobile phone, a data repository, an external storage device, and so forth.

The method comprises determining a structure of the tablature using at least one feature recognition algorithm, using the at least one processor, wherein the structure of the tablature is indicative of structural elements of the tablature. Herein, the term "feature recognition algorithm" refers to a procedure that is used to compute abstractions of the tablature and make local decisions at every point of the tablature to determine whether there is a feature of a given type at that point or not. In this regard, the feature recognition algorithm determines the structural elements of the given type at that point in the structure of the tablature. Optionally, the structure of the tablature includes structural elements such as tab blocks, individual staff lines, line breaks, chords, lyrics, and so forth. In an example, the future recognition algorithm is used to determine whether the structure of the tablature includes chords. Optionally, the method employs the future recognition algorithm to determine whether the structure of the tablature includes lyrics. Optionally, the method employs the future recognition algorithm to determine whether the structure of the tablature includes a combination of the lyrics and the chords.

The method comprises determining one or more parameters of a display environment whereat the tablature is to be scrolled using the at least one processor. Herein, the display environment refers to a graphical user interface that may be viewed in full screen or may be scaled down and re-positioned on a screen of a display device. Optionally, the display environment may be a website, a dashboard, or other display space. Optionally, the display device may be a computing device, a desktop, a laptop computer, a portable electronic device, a television, a monitor, and the like. Optionally, the display device may support the tablature generation. Suitably, the method employs the display environment for viewing the scrolling of the tablature thereon. In this regard, the one or more parameters of the display environment are determined to identify a visual content area of the tablature. Moreover, the display environment comprises a viewport.

In some embodiments, the one or more parameters of the display environment comprise one or more of: a size of the viewport, a shape of the viewport, a font size. In this regard, the method supports determination of the size of the viewport whereat the tablature is to be scrolled. In this regard, the size of the viewport encompasses both a height and a width of the viewport of the display environment. Optionally, the shape of the viewport may be a rectangular, square, elliptical, circular, and so forth. Optionally, the size of the viewport may be equal to the size of the display environment. Moreover, the display environment includes an optimum font size to improve the readability of the tablature that is being scrolled thereon. In such a case, the method supports determining the font size of the display environment. Optionally, a size of the display environment may be larger than the size of the viewport, since the display environment may have certain regions on which the visual content is not rendered. In an example, when the display environment is a website then the tablature may not take up the entire screen in width. Optionally, the size of the viewport may change when the user resizes the display environment such as a browser window. Optionally, when the display environment is a mobile application then the tablature may take the entire screen in width. Optionally, the view height of the tablature may depend on the viewport of the display environment. Optionally, the view height may also be reduced due to the panel with controls (at the bottom and at the top of the tablature).

The method comprises building an abstract syntax tree of the tablature comprising an array of the structural elements of the tablature, using the at least one processor, based on the structure of the tablature and the one or more parameters. Herein, the term "abstract syntax tree" refers to a data structure written in a formal language to represent the abstract syntactic structure of text (such as a source code). Advantageously, the method supports the building of the abstract syntax tree that represents a re-structuring of the tablature that is optimized according to the one or more parameters of the display environment. For example, two rows of staff lines on the tablature may be divided into four equal segments of staff lines, for displaying on the display device such as the mobile phone. In such an example, a length of the segments would be half of a length of the rows of the staff lines. In this regard, the re-structuring indicated in the abstract syntax tree may be effectively utilized for correctly viewing and for accurate scrolling of the tablature on the display environment. Optionally, the tablature may be presented in a format described below:
{
tab: [
text: ['chord' || 'string'],
text: ['chord' || 'string']
],
}

As shown above, the tablature is divided into the array of the structural elements of the tablature such that the structural elements could accurately fit in width into the display environment. It will be appreciated that the array of the structural elements supports accurate identification of the structural elements of the tablature in order to build the abstract syntax tree.

The method comprises determining a scrolling time period in which a portion of the tablature that is displayed on a given region of a viewport of the display environment is to be replaced by a next portion of the tablature, using the at least one processor. Herein, each portion of the tablature include different structural elements thereof. For example, each portion of the tablature may include different set of tablature lines. Herein, the term viewport refers to a visual area of the display environment as it is displayed on the display device. Optionally, the viewport may be designed in a responsive and user-friendly manner to ensure an improved and efficient displaying of the portion of the tablature. Herein, the term given region refers to a section of viewport upon which the portion of the tablature is displayed. Herein, the term scrolling time period refers to the time during which a particular structural element or the portion of the tablature is fixed at the centre of the viewport of the display environment. In this regard, the scrolling time period is indicative of the time duration in which the portion of tablature is to be replaced by the next portion of the tablature. In this regard, the at least one processor is used for identifying the structural elements of the tablature and then based on the identified structural elements the scrolling time period is determined.

The method comprises scrolling the tablature according to at least the abstract syntax tree of the tablature and the scrolling time period, in the display environment, using the at least one processor. In this regard, the scrolling of the tablature includes moving the tablature on the display environment. Optionally, the tablature may be scrolled in an upward or a downward direction in order to view the portion of the tablature in the given region of the viewport of the display environment. Optionally, the scrolling may be a vertical scrolling of the tablature. For example, during the vertical scrolling the top portion of the tablature is viewed prior to the bottom portion of the tablature.

In some embodiments, the tablature represents strings and frets of a musical instrument, and wherein the structure of the tablature is indicative of at least staff lines and line breaks on the staff lines in the tablature, and wherein the abstract syntax tree indicates: two or more segments of staff lines, and a start position and an end position for each segment of staff lines. Optionally, the musical instrument may be a fretted stringed instrument such as a guitar, a lute, a vihuela, a bass, a ukulele, a violin, and so forth. Optionally, the musical instrument is a non-fretted instrument such as a drum, a harmonica, and so forth. Moreover, the musical instrument comprises one or more strings. Optionally, the string refers to a vibrating element that is used to produce a sound in the musical instruments. Optionally, the strings are fabricated using a flexible material in order to hold thereto under tension, thereby enabling a controllable vibration thereof. Optionally, the flexible material may be an alloy (such as steel), a synthetic polymer (such as nylon), and so forth. Furthermore, the musical instrument comprises one or more frets. Optionally, the frets refer to thin strips of material, usually metal wire, inserted laterally at specific positions along a neck or fretboard of the musical instrument. Optionally, the frets are used to obtain a desired music note.

In this regard, the tablature for plucked strings is based upon a diagrammatic representation of the strings and frets of the musical instrument. In this regard, the structure of the tablature includes one [tab] [/tab] block that includes staff lines and line breaks therebetween. The staff lines are represented as horizontal lines on the tablature. Optionally, each of the horizontal staff line represents the string of the musical instrument. For example, the tablature for the four-string bass comprises four staff lines. Optionally, the uppermost staff line on the tablature represents a high pitched string on the musical instrument. Optionally, the lowest staff line of the tablature represents a lowest pitched string on the musical instrument. Optionally, the staff lines may be numbered 1 through 6 instead, representing standard string numbering, where "1" is the high E string, "2" is the B string, and so forth. Moreover, the structure of the tablature represents frets. In this regard, the frets are represented by the numbers written on the staff lines. For example, a number 3 written on the staff indicates that the music player is required to press down at the third fret on the high E (first string). In another example, a number 0 denotes the nut that is, an open string. Moreover, the structure of the tablature includes line break on the staff lines. Optionally, the line breaks are indicated by "I" notation on the staff lines. Optionally, the line break may represent the end of the staff line. Optionally, the line break may represent a close end of the measure on the tablature. Optionally, the position of the line breaks may follow a logical pattern to preserve the markup while scrolling the tablature. Optionally, the line break (depicted as -I-) construction should be moved with the line break (depicted as -I) on one staff line and line break (depicted as I-) on the other staff line. Optionally, a position of the line break may depend on the number of characters in one staff line to ensure that the tablature's content is within the content area. Optionally, the said parameter is calculated based on the size of the display environment and the font size of the text on the tablature.

In some embodiments, the step of determining the scrolling time period comprises:

selecting a first playback speed coefficient;

determining a first scrolling coefficient for the two or more segments of staff lines in the abstract syntax tree; and calculating the scrolling time period as a product of the first playback speed coefficient and the first scrolling coefficient.

Herein, the term first playback speed coefficient refers to a speed at which the tablature, that indicates at least staff lines and line breaks, is scrolled on the display environment. In this regard, the method supports selection of the first playback speed coefficient based on the structure of the tablature. In some embodiments, the first playback speed coefficient lies in a range of 0.1 to 1.5. Optionally the first playback speed coefficient lies in a range of 0.1 to 0.5, or 0.1 to 1.0, or from 0.1 to 1.5 μm, or from 0.5 to 1.0, or from 0.5 to 1.5, such as from 1.0 to 1.5. It will be appreciated that the aforementioned range supports efficient scrolling and displaying of the tablature on the display environment.

Herein, the term first scrolling coefficient refers to a total time that is required for scrolling the tablature at a corresponding first playback speed coefficient. Optionally, the method identifies the structural elements of the tablature in order to determine the first scrolling coefficient. The method identifies that the tablature is indicative of two or more segments of staff lines in the abstract syntax tree. In some embodiments, the first scrolling coefficient depends on a number of beats per minute of the tablature, a number of bars in the tablature, and a bar multiplier. Optionally, the number of beats per minute of the tablature is different for different parts of the tablature. Optionally, in this regard, a value of the first scrolling coefficient would be different for different segments of staff lines. In other words, the value of the first scrolling coefficient is not a constant. Optionally, a value of the first scrolling coefficient for a given segment of the staff lines may depend on the number of beats per minute of the portion of the tablature that corresponds to the given segment of the staff lines. Alternatively, optionally, the number of beats per minute of the tablature is constant. Optionally, the first scrolling coefficient may be a pre-specified value in the tablature. Optionally, the first scrolling coefficient may be a default value, an average value of different numbers of beats per minute of different parts of the tablature, or similar. Herein, the term bar multiplier refers to a specific section of the tablature that is required to be scrolled through a number of times. Optionally, each part of the tablature may include a certain number of beats. Optionally, the number of beats per minute is 128 BPM. In this regard, the method supports calculation of the scrolling time period of the two or more segments of the staff lines. Moreover, the scrolling time period is a product of the first playback speed coefficient and the first scrolling coefficient.

In some embodiments, the tablature represents text-strings, and wherein the structure of the tablature is indicative of lyrics and/or chords, and wherein the abstract syntax tree indicates at least one of: two or more lines of lyrics, two or more lines of chords, and a start position and an end position for each line of lyrics and/or each line of chords. In this regard, the method uses the at least one feature recognition algorithm for determining that the structure of the tablature is indicative of text-strings. Optionally, the structure of the tablature is indicative of the lyrics such that the tablature may be followed easily. Herein, the term chords refer to a harmonic set of pitches or frequencies consisting of multiple notes that are heard as if sounding simultaneously. Optionally, the tablature includes various kinds of chord names such as C, E, G, Am, and so forth, to represent the chords. Optionally, the tablature includes symbols in different contexts to represent the chords. Optionally, the symbols may be indicated as o or + for diminished and augmented chords, respectively. Optionally, when the tablature includes text-strings then the structure of the tablature is indicative of lyrics of the song and the chords. Optionally, when the tablature includes text-strings then the structure of the tablature is indicative of the chords of the song. Optionally, the method supports building of the abstract syntax tree that indicates two or more lines of lyrics along with the corresponding chords. Optionally, the method supports building of the abstract syntax tree that indicates two or more lines of chords. Optionally, the method supports building of the abstract syntax tree that indicates a start position and an end position for each line of lyrics and/or each line of chords.

In some embodiments, the step of determining the scrolling time period comprises:
  selecting a second playback speed coefficient;
  determining a second scrolling coefficient for at least one of: the two or more lines of lyrics, the two or more lines of chords in the abstract syntax tree; and
  calculating the scrolling time period as a product of the second playback speed coefficient and the second scrolling coefficient.

Herein, the second playback speed coefficient refers to a speed at which the tablature, that indicates text-strings, is scrolled on the display environment. In this regard, the method supports selection of the first playback speed coefficient based on the lines of lyrics and the lines of chords. In some embodiments, the second playback speed coefficient lies in a range of 0.1 to 1.5. Optionally the second playback speed coefficient lies in a range of 0.1 to 0.5, or 0.1 to 1.0, or from 0.1 to 1.5 µm, or from 0.5 to 1.0, or from 0.5 to 1.5, such as from 1.0 to 1.5. Herein, the term second scrolling coefficient refers to a total time that is required for scrolling the two or more lines of lyrics and the two or more lines of chords at a corresponding second playback speed coefficient of the tablature.

In some embodiments, when the structure of the tablature is indicative of the lyrics and the chords, the second scrolling coefficient depends on a string length of the two or more lines of lyrics and a number of beats per minute of the tablature. In this regard, the string length of the two or more lines of lyrics may be the calculated by determining a language in which the two or more lines of lyrics are written. Optionally, the length of the text string is calculated in characters without spaces. Optionally, the number of beats per minute may be calculated from the strumming pattern of the tablature.

In some embodiments, when the structure of the tablature is indicative of the chords, the second scrolling coefficient depends on a time duration associated with each chord and a number of beats per minute of the tablature. In this regard, the number of beats per minute may also be calculated from the strumming pattern the tablature. Moreover, the step of determining the scrolling time period comprises multiplying the second playback speed coefficient and the second scrolling coefficient to obtain a product thereof. Optionally, the scrolling time period indicates the time duration in which at least one of: a line of lyrics, a line of chords, displayed on the given region of the viewport of the display device is to be replaced by at least one of: a next line of lyrics, a next line of chords, respectively. Optionally, the scrolling time period of the tablature representing the lyrics and the chords is different from the scrolling time period of the tablature representing the staff lines and the line breaks.

In some embodiments, the tablature represents textual information, and wherein the step of scrolling the tablature comprises fixing a position of the textual information on the given region of the viewport. Herein, the term textual information refers to the strings containing the text that does not represent any musical notation. Optionally, the textual information may be a name of a song. Optionally, the textual information may be a name of an artist, a music composer, and so forth. It will be appreciated that such textual information is helpful when the song has been recorded by several artists. Optionally, the textual information may be a name of the musical instrument. Optionally, the textual information may be a title of the tablature. Optionally, the textual information may be an information regarding a style or a genre of the song. It will be appreciated that such textual information is used for understanding of how the song should be played. In this regard, the position of the textual information is fixed on the given region of the viewport, thus the scrolling time period for the tablature representing the textual information is zero.

In some embodiments, the step of scrolling the tablature is implemented upon one of:
  viewing the tablature on the viewport,
  starting playback of a video tutorial corresponding to the tablature,
  receiving an input from the display environment.

In this regard, the method supports scrolling of the tablature when the tablature is required to be displayed on the viewport of the display environment. For example, the method supports the scrolling of the tablature when the user requires accurate viewing of the tablature on the viewport of the display environment. Optionally, the method supports scrolling of the tablature when the playback of the video tutorial corresponding to the tablature is required to be started. Optionally, the method supports scrolling of the tablature when the display environment receives the input via a user interface element of the display environment. Optionally, the input may be a start button or a play button on the display environment. Optionally, only one of the aforementioned cases could be feasible at a given time.

A second aspect of the disclosure provides a system for context-based scrolling of a tablature, the system comprising:
at least one processor configured to:
  receive the tablature from a device at which the tablature is stored or is generated;
  determine a structure of the tablature using at least one feature recognition algorithm, wherein the structure of the tablature is indicative of structural elements of the tablature;
  determine one or more parameters of a display environment whereat the tablature is to be scrolled;
  build an abstract syntax tree of the tablature comprising an array of the structural elements of the tablature, based on the structure of the tablature and the one or more parameters;
  determine a scrolling time period in which a portion of the tablature that is displayed on a given region of a viewport of the display environment is to be replaced by a next portion of the tablature; and
  scroll the tablature according to at least the abstract syntax tree of the tablature and the scrolling time period, in the display environment.

Suitably, the system comprises at least one processor. The term "at least one processor" as used herein refers to an application, program, process or device that responds to requests for information or services by another application, program, process or device (such as the external device) via a network interface. Optionally, the at least one processor may be on the user device. Optionally, the at least one processor may be external to the user device. Optionally, the at least one processor also encompasses software that makes the act of serving information or providing services possible. Optionally, it may be evident that the communication means of the external device may be compatible with a communication means of the at least one processor, in order to facilitate communication therebetween. It will be appreciated that optionally the processor includes, but is not limited to, a microprocessor, a microcontroller, a complex instruction set computing (CISC) microprocessor, a reduced instruction set computer (RISC) microprocessor, a very long instruction word (VLIW) microprocessor, or any other type of processing circuit. Optionally, the term "processor" may refer to one or more individual processors, processing devices and various elements associated with the system. Optionally, the one or more individual processors, processing devices and elements are arranged in various architectures for responding to and processing the instructions that drive the system.

In some embodiments, the tablature represents strings and frets of a musical instrument, and wherein the structure of the tablature is indicative of at least staff lines and line breaks on the staff lines in the tablature, and wherein the abstract syntax tree indicates: two or more segments of staff lines, and a start position and an end position for each segment of staff lines.

In some embodiments, when determining the scrolling time period, the at least one processor is configured to:
select a first playback speed coefficient;
determine a first scrolling coefficient for the two or more segments of staff lines in the abstract syntax tree; and
calculate the scrolling time period as a product of the first playback speed coefficient and the first scrolling coefficient.

In some embodiments, the tablature represents text-strings, and wherein the structure of the tablature is indicative of lyrics and/or chords, and wherein the abstract syntax tree indicates at least one of: two or more lines of lyrics, two or more lines of chords, and a start position and an end position for each line of lyrics and/or each line of chords.

In some embodiments, when determining the scrolling time period, the at least one processor is configured to:
select a second playback speed coefficient;
determine a second scrolling coefficient for at least one of:
the two or more lines of lyrics, the two or more lines of chords in the abstract syntax tree; and
calculate the scrolling time period as a product of the second playback speed coefficient and the second scrolling coefficient.

A third aspect of the disclosure provides a computer program product comprising a non-transitory machine-readable data storage medium having stored thereon program instructions that, when executed by a processor, cause the processor to:
receive a tablature from a device at which the tablature is stored or is generated;
determine a structure of the tablature using at least one feature recognition algorithm, wherein the structure of the tablature is indicative of structural elements of the tablature;
determine one or more parameters of a display environment whereat the tablature is to be scrolled;
build an abstract syntax tree of the tablature comprising an array of the structural elements of the tablature, based on the structure of the tablature and the one or more parameters;
determine a scrolling time period in which a portion of the tablature that is displayed on a given region of a viewport of the display environment is to be replaced by a next portion of the tablature; and
scroll the tablature according to at least the abstract syntax tree of the tablature and the scrolling time period, in the display environment.

Optionally, the computer program product is implemented as an algorithm, embedded in a software stored in the non-transitory machine-readable data storage medium. The non-transitory machine-readable data storage medium may include, but is not limited to, an electronic storage device, a magnetic storage device, an optical storage device, an electromagnetic storage device, a semiconductor storage device, or any suitable combination of the foregoing. Examples of implementation of the computer-readable medium include, but are not limited to, Electrically Erasable Programmable Read-Only Memory (EEPROM), Random Access Memory (R.A.M), Read Only Memory (ROM), Hard Disk Drive (HDD), Flash memory, a Secure Digital (SD) card, Solid-State Drive (SSD), a computer readable storage medium, and/or CPU cache memory.

Throughout the description and claims of this specification, the words "comprise" and "contain" and variations of the words, for example "comprising" and "comprises", mean "including but not limited to", and do not exclude other components, integers or steps. Moreover, the singular encompasses the plural unless the context otherwise requires: in particular, where the indefinite article is used, the specification is to be understood as contemplating plurality as well as singularity, unless the context requires otherwise.

Preferred features of each aspect of the disclosure may be as described in connection with any of the other aspects. Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

BRIEF DESCRIPTION OF THE DRAWINGS

One or more embodiments of the disclosure will now be described, by way of example only, with reference to the accompanying drawings, in which.

DETAILED DESCRIPTION

Figure 1:
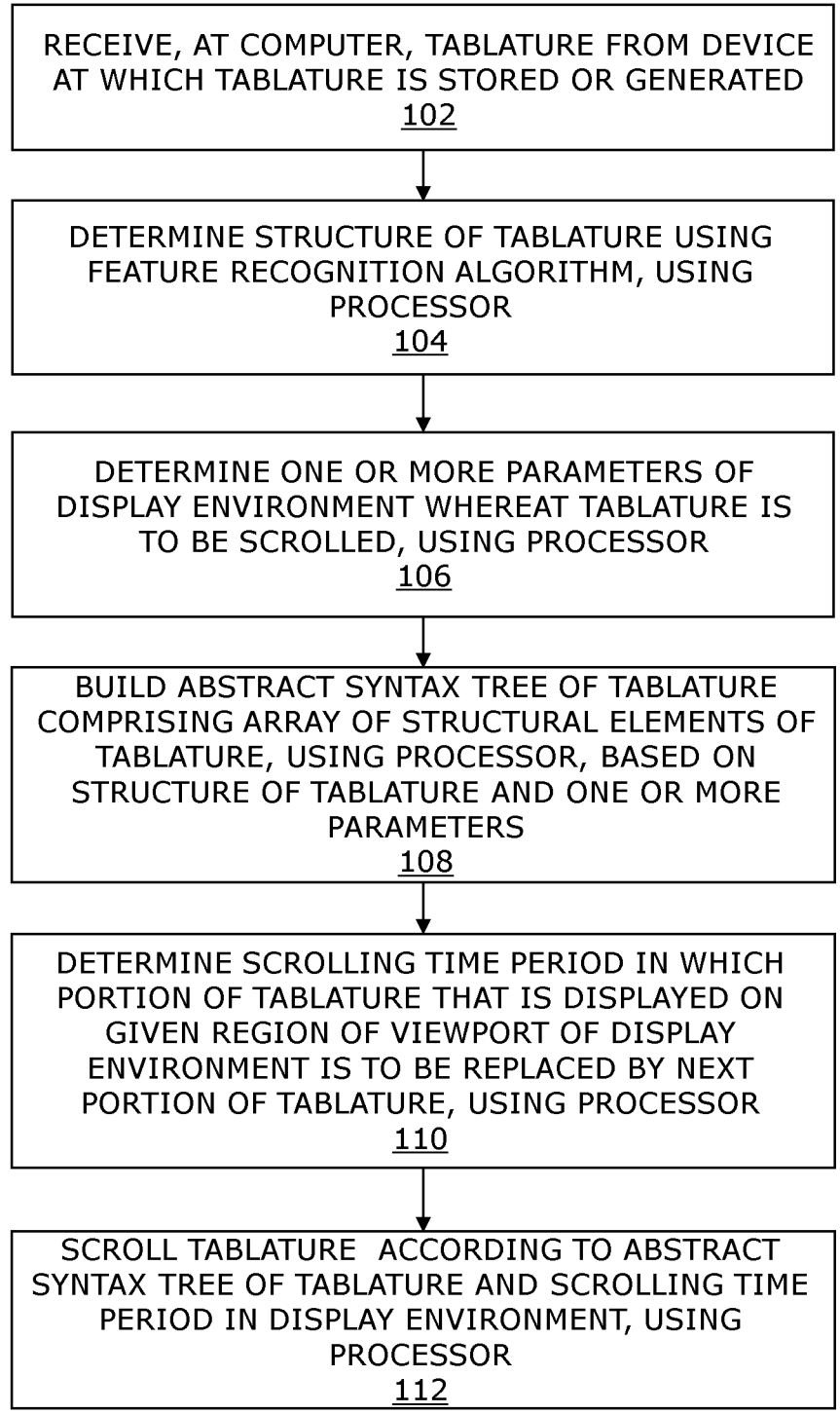
FIG. 1 is a flowchart depicting steps of a computer-implemented method for context-based scrolling of a tablature, in accordance with an embodiment of the present disclosure.

Referring to FIG. 1, illustrated is a flowchart depicting steps of a computer-implemented method for context-based scrolling of a tablature, in accordance with an embodiment of the present disclosure. At step 102, the tablature is received, at a computer, from a device at which the tablature is stored or is generated, wherein the computer comprises at least one processor. At step 104, a structure of the tablature is determined using at least one feature recognition algorithm, using the at least one processor, wherein the structure of the tablature is indicative of structural elements of the tablature. At step 106, one or more parameters of a display environment whereat the tablature is to be scrolled are determined using the at least one processor. At step 108, an abstract syntax tree of the tablature comprising an array of the structural elements of the tablature is built, based on the structure of the tablature and the one or more parameters. At step 110, a scrolling time period is determined using the at least one processor, in which a portion of the tablature that is displayed on a given region of a viewport of the display environment is to be replaced by a next portion of the tablature. At step 112, the tablature is scrolled according to at least the abstract syntax tree of the tablature and the scrolling time period, in the display environment, using the at least one processor.

The aforementioned steps are only illustrative and other alternatives can also be provided where one or more steps are added, one or more steps are removed, or one or more steps are provided in a different sequence without departing from the scope of the claims herein.

Figure 2A:
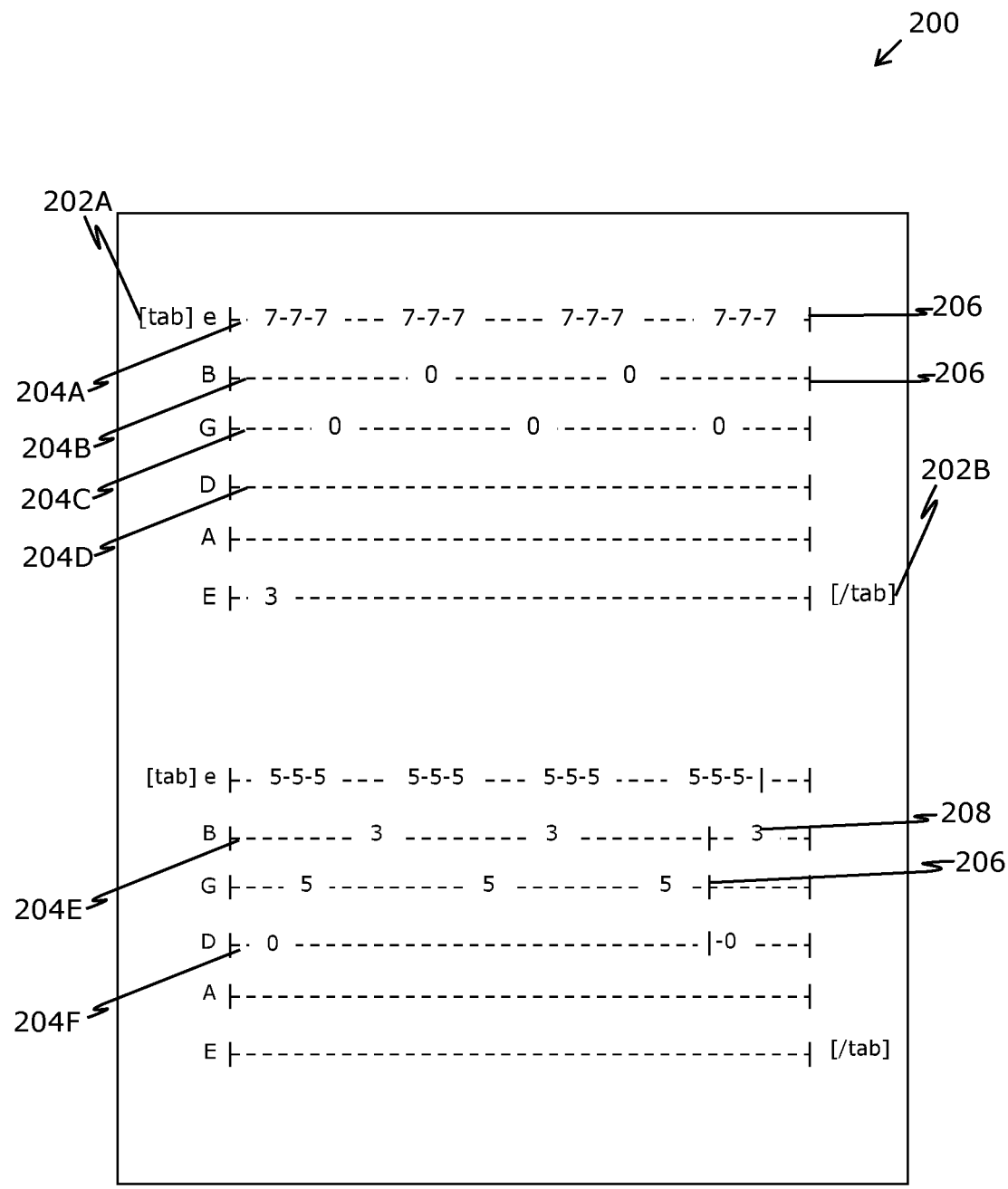
FIGS. 2A, 2B and 2C illustrate views of a structure of a tablature, in accordance with different embodiments of the present disclosure.
Figure 2B:
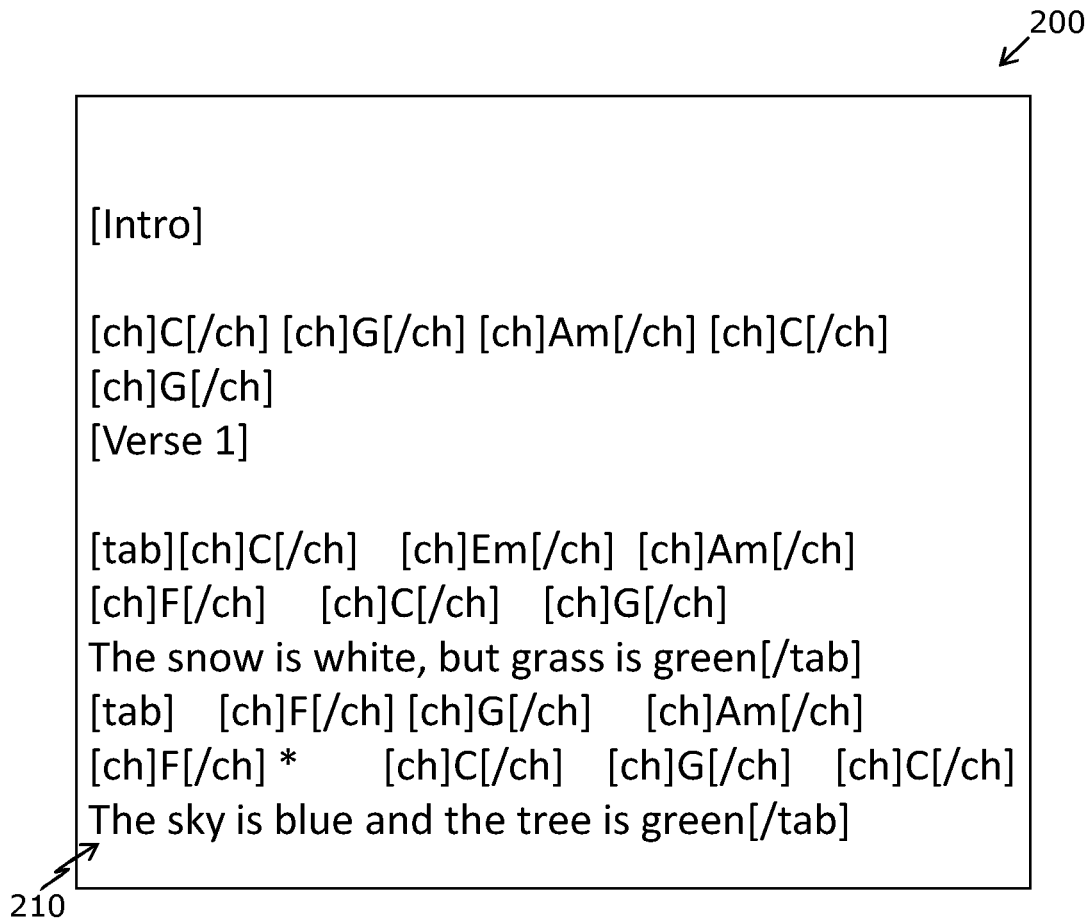
Figure 2C:
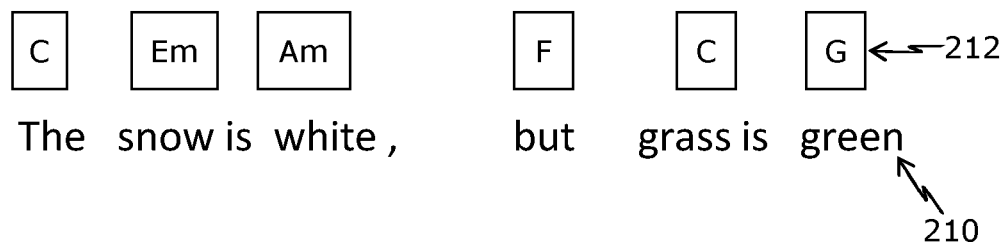

Referring to FIGS. 2A, 2B and 2C, illustrated are views of a structure of a tablature 200, in accordance with different embodiments of the present disclosure. As shown in FIG. 2A, the structure of the tablature 200 includes a first set of staff lines and a second set of staff lines. Moreover, the structure of the tablature includes one or more tab blocks (depicted as [tab] and [/tab] notations) such as 202A and 202B. As shown, each of the first set of staff lines and a second set of staff lines comprises one or more staff lines such as 204A, 204B, 204C, 204D, 204E and 204F that represent one or more strings in a musical instrument (not shown). Furthermore, the each of the first set of staff lines and a second set of staff lines includes one or more line breaks 206 (depicted by "l" notation) on the staff lines such as 204A, 204B, 204C, 204D, 204E and 204F. The structure of the tablature 200 is also indicative of frets such as 208. As shown, the staff line 204E with the fret number 208 (depicted as 3) represents that a musician is required to place his third finger on a second string of the musical instrument. As shown in FIGS. 2B and 2C, the structure of the tablature includes one or more chord blocks (depicted between [ch] and [/ch] notations). As shown, the structure of the tablature 200 is indicative of lyrics 210 and chords (depicted as C, G, Am, Em and F within the one or more chord blocks) 212 of a song.

FIGS. 2A, 2B, and 2C are merely examples, which should not unduly limit the scope of the claims herein. A person skilled in the art will recognize many variations, alternatives, and modifications of embodiments of the present disclosure.

Figure 3A:
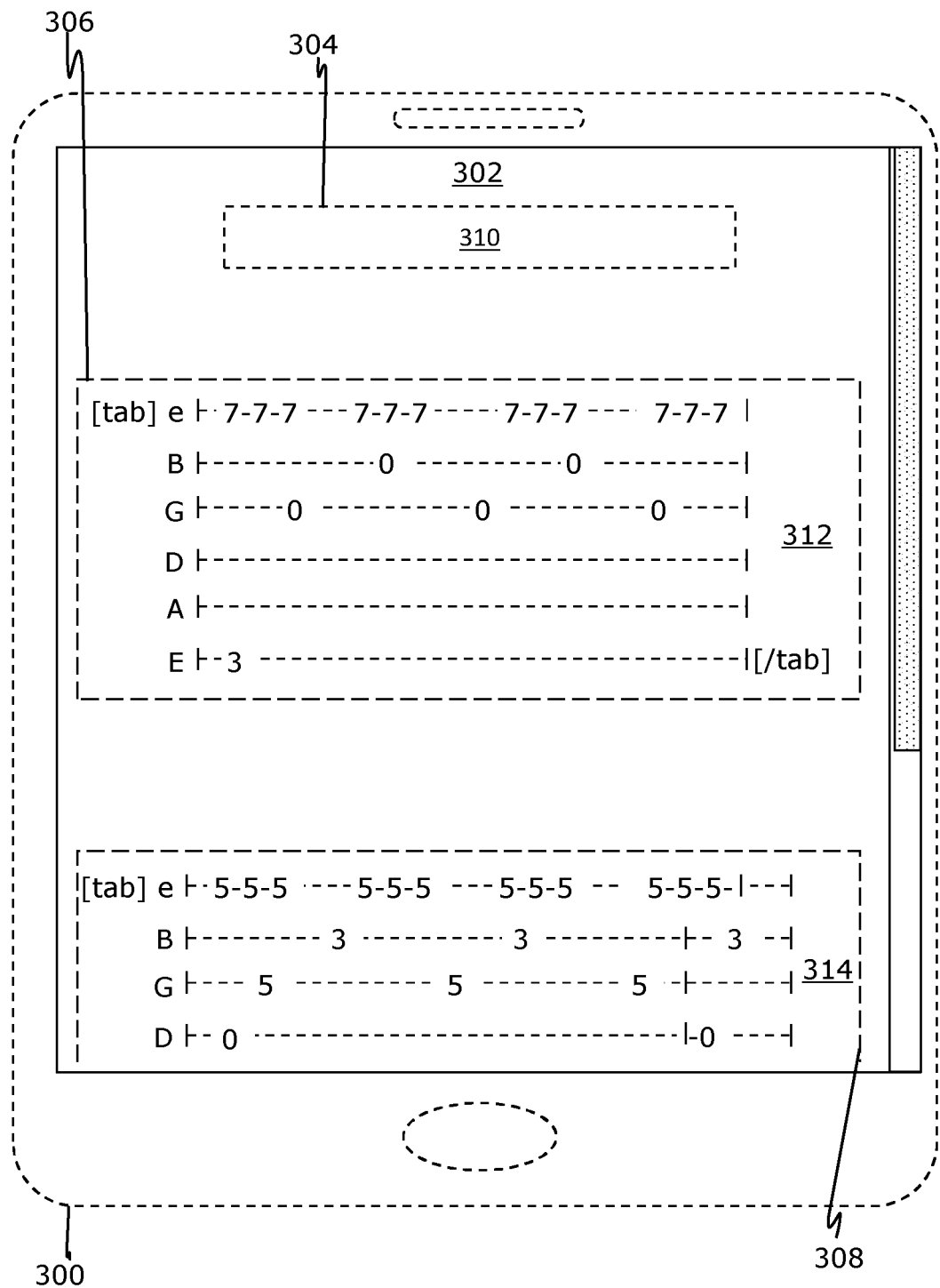
FIGS. 3A and 3B illustrate views of scrolling a tablature on a display device, in accordance with another embodiment of the present disclosure.
Figure 3B:
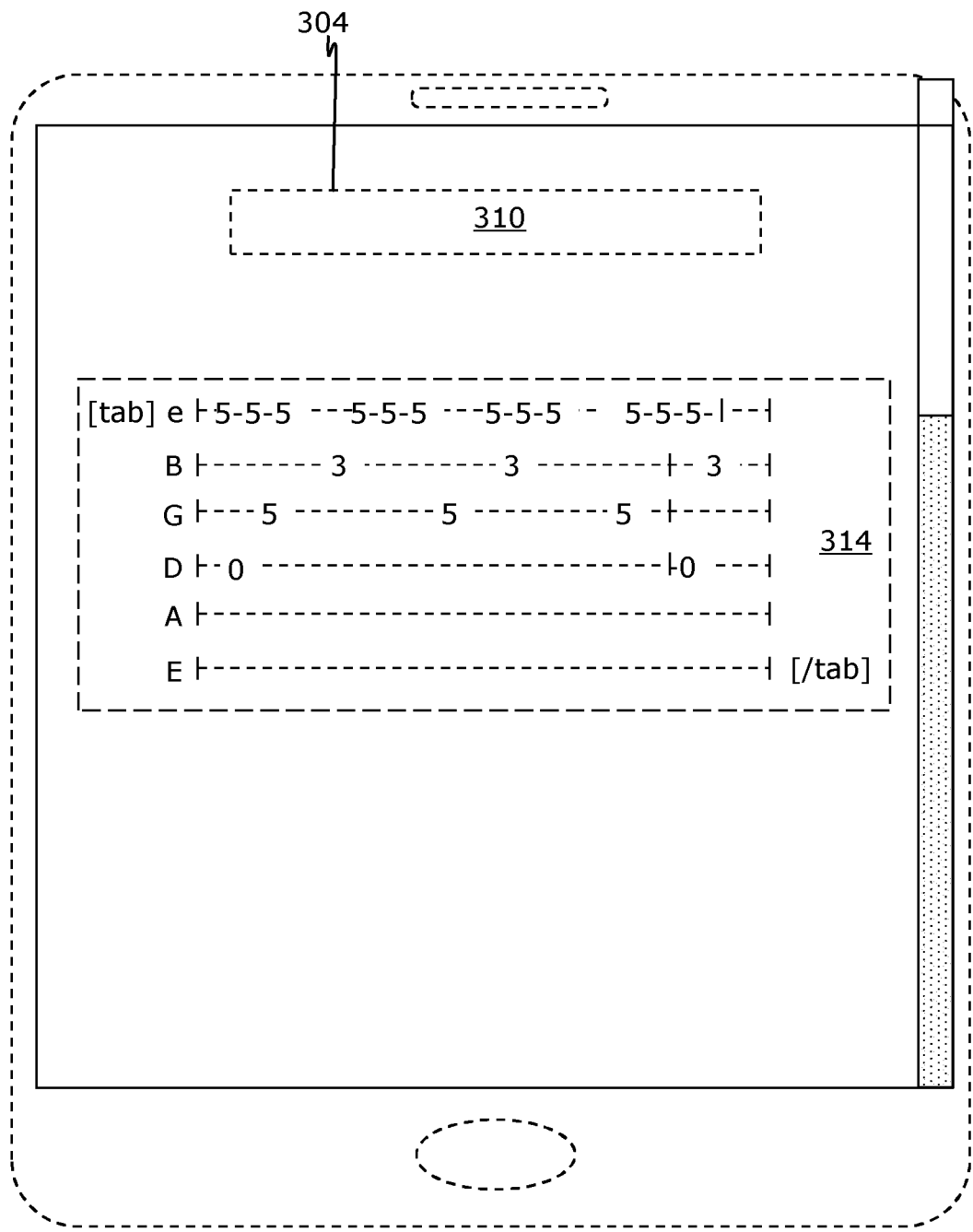

Referring to FIGS. 3A and 3B, illustrated are views of a vertical scrolling of a tablature on a display device 300, in accordance with another embodiment of the present disclosure. As shown, the display device 300 includes a viewport 302. Herein, a shape of the viewport 302 is rectangular. The viewport 302 includes a first region 304, a second region 306 and a third region 308. The first region 304 is representing a textual information 310. The second region 306 is representing a portion 312 of the tablature. The third region 308 is representing a next portion 314 of the tablature. As shown in FIG. 3A, at time t1, the portion 312 of the tablature that is displayed on the second region 306 of the viewport 302 is to be replaced by the next portion 314 of the tablature. As shown in FIG. 3B, at time t2, the first region 304 remain intact on the viewport 302 since it is displaying the textual information 310. The viewport 302 is also displaying the third region 308.

FIGS. 3A and 3B are merely examples, which should not unduly limit the scope of the claims herein. A person skilled in the art will recognize many variations, alternatives, and modifications of embodiments of the present disclosure.

Figure 4:
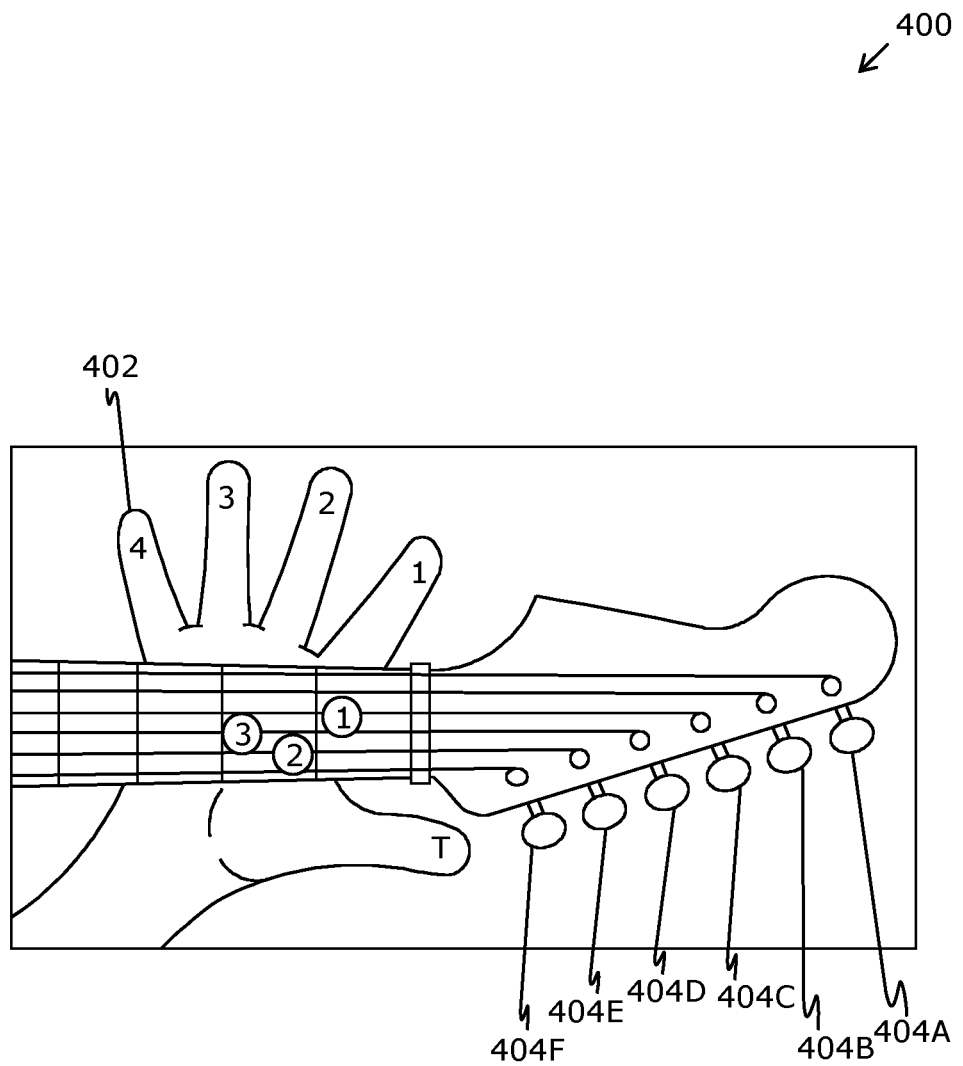
FIG. 4 illustrates a schematic illustration of a plurality of strings and frets of a musical instrument, in accordance with an embodiment of the present disclosure.

Referring to FIG. 4 illustrated is a schematic illustration of a musical instrument 400 being played by a user 402, in accordance with an embodiment of the present disclosure. As shown, the musical instrument 400 is a stringed instrument. The musical instrument 400 is having six strings such as 404A, 404B, 404C, 404D, 404E and 404F. Moreover, the musical instrument 400 is having a plurality of frets (depicted by numerals 1, 2 and 3). As shown, the plurality of frets indicates a position of fingers of the user 402 on the corresponding strings such as 404A, 404B, 404C, 404D, 404E and 404F.

FIG. 4 is merely an example, which should not unduly limit the scope of the claims herein. A person skilled in the art will recognize many variations, alternatives, and modifications of embodiments of the present disclosure.

Figure 5A:
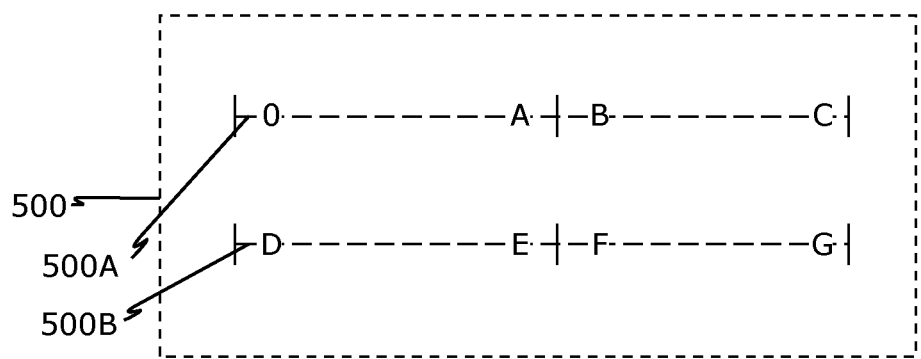
FIGS. 5A and 5B illustrate views of building an abstract syntax tree of a tablature, based on the structure of the tablature and one or more parameters of a display device, in accordance with another embodiment of the present disclosure.
Figure 5B:
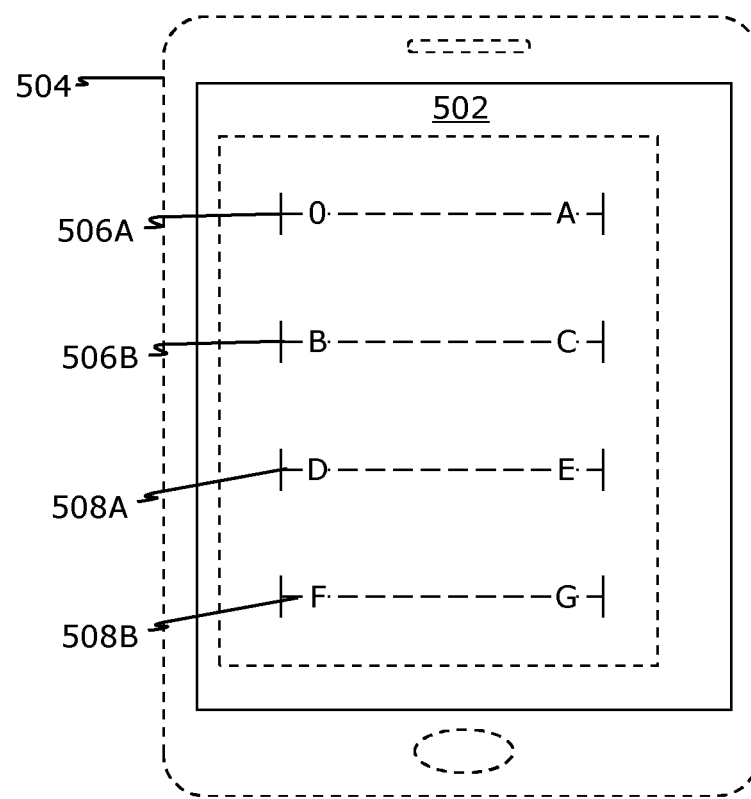

FIGS. 5A and 5B illustrate re-structuring of a tablature 500 in a display environment 502 using an abstract syntax tree, in accordance with an embodiment of the present disclosure. As shown in FIG. 5A, the tablature 500 is indicative of a first staff line 500A and a second staff line 500B. As shown in FIG. 5B, the tablature 500 is re-structured using the abstract syntax tree in order to be displayed on a display environment 502 of the display device 504. The display device 504 is a mobile phone. Herein, the first staff line 500A is divided into two equal segments of staff lines such as 506A and 506B for displaying thereof on the display environment 502 of the display device 504. Similarly, the second staff line 500B is divided into two equal segments of staff lines such as 508A and 508B for displaying thereof on the display environment 502 of the display device 504. Moreover, the length of the segments is half of a length of the staff lines 500A and 500B.

FIGS. 5A and 5B are merely examples, which should not unduly limit the scope of the claims herein. A person skilled in the art will recognize many variations, alternatives, and modifications of embodiments of the present disclosure.

Figure 6:
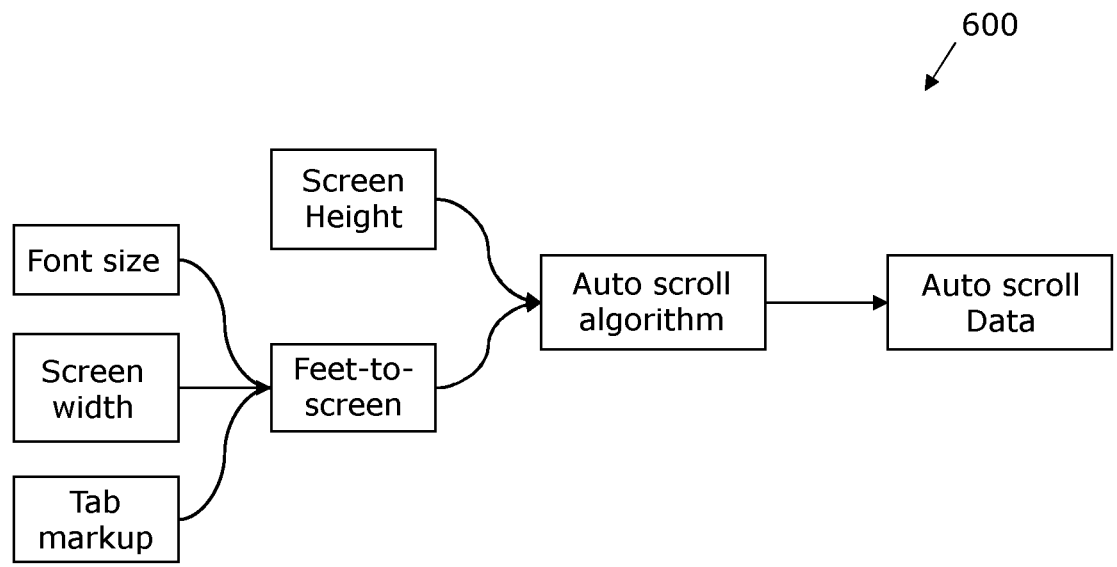
FIG. 6 illustrates a flowchart of an abstract syntax tree of a tablature, in accordance with an embodiment of the present disclosure.

FIG. 6 illustrates a diagram representing an abstract syntax tree 600 of a tablature, in accordance with an embodiment of the present disclosure. As shown, the abstract syntax tree 600 is built by calculating a font size and a number of characters that could be fit in one staff line of the tablature. Moreover, in the abstract syntax tree 600 each line with lyrics and chords is divided into several lines to fit in the length of the line. It will be appreciated that such re-structuring of the tablature ensures that words of the lyrics are not transferred in parts, and also if there is a word over which there is a chord, then they are always transferred together. Furthermore, in the abstract syntax tree 600 of the tablature each staff lines and line breaks on the staff lines in the tablature are transferred taking into account line breaks, as well as significant staff line characters that indicate the string and a corresponding measure to clamp.

Figure 7:
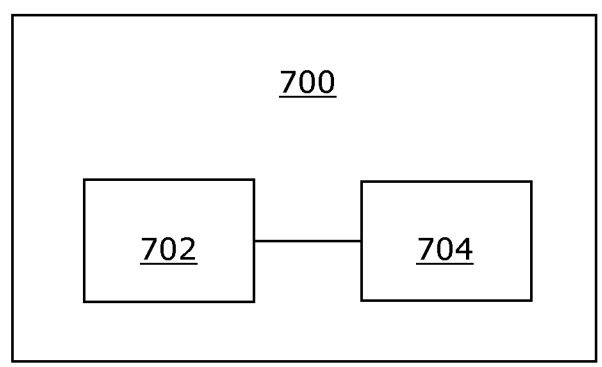
FIG. 7 illustrates a block diagram of a system for context-based scrolling of a tablature, in accordance with an embodiment of the present disclosure.

FIG. 7 illustrates a block diagram of a system 700 for context-based scrolling of a tablature, in accordance with an embodiment of the present disclosure. The system 700 comprises at least one processor 702 (implemented herein as a processor 702). The processor 702 is configured to receive the tablature from a device (not shown) at which the tablature is stored or is generated, determine a structure of the tablature using at least one feature recognition algorithm, determine one or more parameters of a display environment 704 whereat the tablature is to be scrolled, build an abstract syntax tree comprising an array of the structural elements of the tablature, determine a scrolling time period in which a portion of the tablature that is displayed on a given region of a viewport of the display environment 704 is to be replaced by a next portion of the tablature and scroll the tablature according to at least the abstract syntax tree of the tablature and the scrolling time period, in the display environment.

What is claimed is:

1. A computer-implemented method for context-based scrolling of a tablature, the method comprising:
   receiving, at a computer, the tablature from a device at which the tablature is stored or is generated, wherein the computer comprises at least one processor, and wherein the tablature represents strings and frets of a musical instrument;
   determining a structure of the tablature using at least one feature recognition algorithm, using the at least one processor, wherein the structure of the tablature is indicative of structural elements of the tablature, and wherein the structure of the tablature is indicative of at least staff lines and line breaks on the staff lines in the tablature;
   determining one or more parameters of a display environment whereat the tablature is to be scrolled, using the at least one processor;
   building an abstract syntax tree of the tablature comprising an array of the structural elements of the tablature, using the at least one processor, based on the structure of the tablature and the one or more parameters, and wherein the abstract syntax tree indicates: two or more segments of staff lines, and a start position and an end position for each segment of staff lines;
   determining a scrolling time period in which a portion of the tablature that is displayed on a given region of a viewport of the display environment is to be replaced by a next portion of the tablature, using the at least one processor, wherein the step of determining the scrolling time period comprises:
   selecting a first playback speed coefficient;
   determining a first scrolling coefficient for the two or more segments of staff lines in the abstract syntax tree; and
   calculating the scrolling time period as a product of the first playback speed coefficient and the first scrolling coefficient; and
   scrolling the tablature according to at least the abstract syntax tree of the tablature and the scrolling time period, in the display environment, using the at least one processor.

2. The computer-implemented method according to claim 1, wherein the first playback speed coefficient lies in a range of 0.1 to 1.5.

3. The computer-implemented method according to claim 1, wherein the first scrolling coefficient depends on a number of beats per minute of the tablature, a number of bars in the tablature, and a bar multiplier.

4. The computer-implemented method according to claim 1, wherein the tablature represents text-strings, and wherein the structure of the tablature is indicative of lyrics and/or chords, and wherein the abstract syntax tree indicates at least one of: two or more lines of lyrics, two or more lines of chords, and a start position and an end position for each line of lyrics and/or each line of chords.

5. The computer-implemented method according to claim 4, wherein the step of determining the scrolling time period comprises:
   selecting a second playback speed coefficient;
   determining a second scrolling coefficient for at least one of: the two or more lines of lyrics, the two or more lines of chords in the abstract syntax tree; and
   calculating the scrolling time period as a product of the second playback speed coefficient and the second scrolling coefficient.

6. The computer-implemented method according to claim 5, wherein when the structure of the tablature is indicative of the lyrics and the chords, the second scrolling coefficient depends on a string length of the two or more lines of lyrics and a number of beats per minute of the tablature.

7. The computer-implemented method according to claim 5, wherein when the structure of the tablature is indicative of the chords, the second scrolling coefficient depends on a time duration associated with each chord and a number of beats per minute of the tablature.

8. The computer-implemented method according to claim 5, wherein the second playback speed coefficient lies in a range of 0.1 to 1.5.

9. The computer-implemented method according to claim 1, wherein the tablature represents textual information, and wherein the step of scrolling the tablature comprises fixing a position of the textual information on the given region of the viewport.

10. The computer-implemented method according to claim 1, wherein the step of scrolling the tablature is implemented upon one of:
    viewing the tablature on the viewport,
    starting playback of a video tutorial corresponding to the tablature,
    receiving an input from the display environment.

11. The computer-implemented method according to claim 1, wherein the one or more parameters of the display environment comprise one or more of: a size of the viewport, a shape of the viewport, a font size.

12. A system for context-based scrolling of a tablature, the system comprising at least one processor configured to:
    receive the tablature from a device at which the tablature is stored or is generated, wherein the tablature represents strings and frets of a musical instrument;
    determine a structure of the tablature using at least one feature recognition algorithm, wherein the structure of the tablature is indicative of structural elements of the tablature, and wherein the structure of the tablature is indicative of at least staff lines and line breaks on the staff lines in the tablature;

determine one or more parameters of a display environment whereat the tablature is to be scrolled;

build an abstract syntax tree of the tablature comprising an array of the structural elements of the tablature, based on the structure of the tablature and the one or more parameters, and wherein the abstract syntax tree indicates: two or more segments of staff lines, and a start position and an end position for each segment of staff lines;

determine a scrolling time period in which a portion of the tablature that is displayed on a given region of a viewport of the display environment is to be replaced by a next portion of the tablature, wherein when determining the scrolling time period, the at least one processor is configured to:
select a first playback speed coefficient;
determine a first scrolling coefficient for the two or more segments of staff lines in the abstract syntax tree; and
calculate the scrolling time period as a product of the first playback speed coefficient and the first scrolling coefficient; and scroll the tablature according to at least the abstract syntax tree of the tablature and the scrolling time period, in the display environment.

13. The system according to claim 12, wherein the tablature represents text-strings, and wherein the structure of the tablature is indicative of lyrics and/or chords, and wherein the abstract syntax tree indicates at least one of: two or more lines of lyrics, two or more lines of chords, and a start position and an end position for each line of lyrics and/or each line of chords.

14. The system according to claim 13, wherein when determining the scrolling time period, the at least one processor is configured to:
select a second playback speed coefficient;
determine a second scrolling coefficient for at least one of: the two or more lines of lyrics, the two or more lines of chords in the abstract syntax tree; and
calculate the scrolling time period as a product of the second playback speed coefficient and the second scrolling coefficient.

15. A computer program product comprising a non-transitory machine-readable data storage medium having stored thereon program instructions that, when executed by a processor, cause the processor to:
receive a tablature from a device at which the tablature is stored or is generated, wherein the tablature represents strings and frets of a musical instrument;
determine a structure of the tablature using at least one feature recognition algorithm, wherein the structure of the tablature is indicative of structural elements of the tablature, and wherein the structure of the tablature is indicative of at least staff lines and line breaks on the staff lines in the tablature;
determine one or more parameters of a display environment whereat the tablature is to be scrolled;
build an abstract syntax tree of the tablature comprising an array of the structural elements of the tablature, based on the structure of the tablature and the one or more parameters, and wherein the abstract syntax tree indicates: two or more segments of staff lines, and a start position and an end position for each segment of staff lines;
determine a scrolling time period in which a portion of the tablature that is displayed on a given region of a viewport of the display environment is to be replaced by a next portion of the tablature, wherein when determining the scrolling time period, the at least one processor is configured to:
select a first playback speed coefficient;
determine a first scrolling coefficient for the two or more segments of staff lines in the abstract syntax tree; and
calculate the scrolling time period as a product of the first playback speed coefficient and the first scrolling coefficient; and
scroll the tablature according to at least the abstract syntax tree of the tablature and the scrolling time period, in the display environment.

\* \* \* \* \*